N. PALMER.
Thrashing Machine.
No. 60,778.
Patented Jan. 1, 1867.
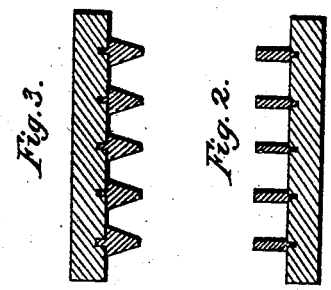
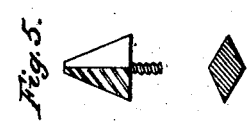
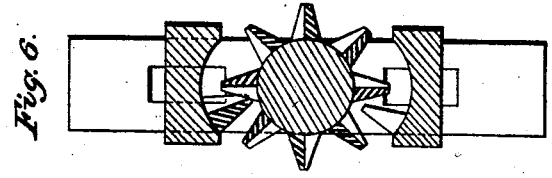
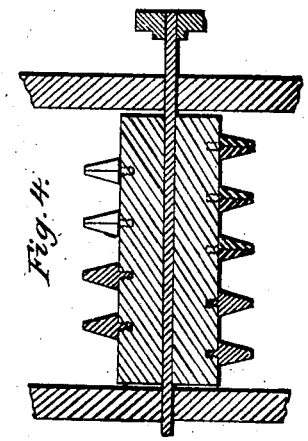
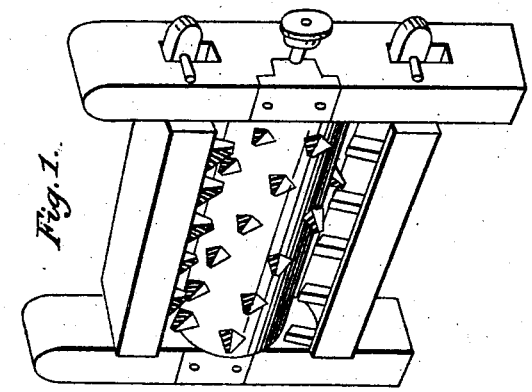
Witnesses.
Inventor.

United States Patent Office.

NELSON PALMER, OF HUDSON, NEW YORK, ASSIGNOR TO HIMSELF AND T. G. PALMER, OF SCHULTZVILLE, NEW YORK.

*Letters Patent No. 60,778, dated January 1, 1867.*

IMPROVEMENT IN THRESHING-MACHINES.

*The Schedule referred to in these Letters Patent and making part of the same.*

TO ALL WHOM IT MAY CONCERN:

Be it known that I, NELSON PALMER, of Hudson, county of Columbia, and State of New York, have invented, made, and applied to use a certain new and useful Improvement in Threshing-Machines; and I do hereby declare the following to be a full, clear, and exact description of the said invention, reference being had to the annexed drawing, making part of this specification, wherein—

Figure 1 is a perspective view.
Figure 2 is a section of the lower concave.
Figure 3 is a section of the upper concave.
Figure 4 is a longitudinal section of the cylinder.
Figure 5 is a perspective view of the cylinder tooth.
Figure 6 is a cross-section of cylinder and concaves.

Like letters refer to like parts in the several views.

The nature of my invention consists in a cylinder and concave or concaves, armed with spikes or teeth which are corrugated or roughened on one side and smooth upon corresponding side of spikes in both cylinder and concave, so that, by reversing the direction of rotation of the cylinder, the machine is adapted to various kinds of work, such as threshing all kinds of grain, threshing and hulling clover seed and other seeds.

To enable others skilled in the art to make and use my invention, I will proceed to describe its construction and operation.

I use one cylinder in constructing my machine. The frame and other parts, (except the teeth which arm the cylinder and one concave,) are constructed in the ordinary form and style, or of any desirable pattern. The teeth which arm the cylinder are in the form of rhomboidal pyramids, as shown in fig. 5. These are set in the cylinder in regular order, with the acute angles transversely to the line of the cylinder, as indicated in fig. 1. Two of the faces which meet to form the acute angle are corrugated or roughened by diagonal or parallel cuts or grooves, so as to present a rough surface, the other two faces being left smooth, the acute angle formed by the meeting of the two smooth faces forming a straight smooth line from the base to the tip of the tooth. These teeth are secured to the face of the cylinder in such a position that those upon the upper side of the cylinder shall present their roughened faces to the tail end of the machine, and, of course, the teeth upon the under side of the cylinder will present their smooth faces towards the tail end of the machine. Now, if the cylinder is caused to revolve, with its front side moving upward, the rough faces of the teeth will look forward, and by reversing the motion of the cylinder, the smooth faces of the teeth will look forward towards their respective concaves, that is to say, the rough faces are all set in one direction, and the smooth faces in the other. The upper concave, shown in section in fig. 3, is armed with teeth constructed like those in the cylinder, with their rough faces looking towards the front of the machine. They are so placed that the teeth of the cylinder will pass between them without contact. But the concave can be adjusted to or from the cylinder, so as to diminish or increase the distance between the obtuse angles of the teeth as they pass each other, as the cylinder rotates. In this manner the obtuse angles can be made to nearly form a contact. Should it be desirable to increase or prolong the opposing action of the roughened surfaces, the obtuse angles can be cut away in the formation of the teeth, as shown in fig. 5, and the flattened surface thus formed roughened as before. In this form of teeth the rough faces remain longer in conjunction, simply by being extended in the direction of the rotation. In hulling clover seed, this extended roughened surface would facilitate the operation, but in ordinary threshing of grain this change would not be required. It is obvious that various other forms of teeth may be used, as triangular, conical, pyramidal, &c., but these changes of form will not affect the leading features of my invention, as hereinbefore set forth. The lower concave is armed with straight smooth spikes, and in all essential particulars similar to the concave formerly used in spiked machines. This concave is also adjustable, which has the effect to increase or lessen the distance between the tapering teeth on the cylinder and those of the concave. For the ordinary threshing of wheat and other cereals, the cylinder should be run with the smooth faces of the teeth forward, in which case the lower concave alone is brought into action, the upper concave presenting no obstruction to the action of the cylinder. For tough or damp grain, clover seed, or other small seeds, the cylinder should be reversed or run with the rough face of the teeth forward, and the proper adjustment of the upper concave will secure the thorough threshing of damp grain or small seed, the straw at the same time becoming more broken and crushed. It is obvious that the position of these concaves may be reversed or changed, the roughened surfaces being below and the smooth ones above, with a corresponding change in the position of the cylinder teeth.

Having thus described my invention, what I claim as new, and desire to secure by Letters Patent, is—

1. Arming a threshing-cylinder with teeth which have their opposite faces rough and smooth, as and for the purpose specified.

2. I claim making the teeth in the cylinder and concave cone shaped, or pyramidal, so that, by adjusting the concave nearer the cylinder, the surfaces of the teeth shall approach nearer to each other.

3. I claim such a construction and arrangement of threshing-machines, having two concaves, as described, that, by the rotation of the threshing-cylinder in one direction, the smooth faces of the teeth are caused to act in concert with the smooth faces of the teeth in one concave; and by reversing the rotation of the cylinder, the rough faces of the teeth are caused to act in concert with the rough faces of the teeth in the other concave.

In testimony whereof I have signed my name to this specification the presence of two subscribing witnesses.

NELSON PALMER.

Witnesses:
JOHN S. HOLLINGSHEAD,
WM. J. FAHERTY.